United States Patent [19]

Goi et al.

[11] Patent Number: 5,106,552

[45] Date of Patent: Apr. 21, 1992

[54] PROCESS OF PRODUCING A FILTER ELEMENT OF COMPOSITE FIBERS

[75] Inventors: Shigeru Goi; Hideo Matsuda, both of Moriyama; Kazuyoshi Nakazawa, Shiga, all of Japan

[73] Assignee: Chisso Corporation, Ohsaka, Japan

[21] Appl. No.: 320,167

[22] Filed: Mar. 7, 1989

[30] Foreign Application Priority Data

Mar. 22, 1988 [JP] Japan ................................ 63-67903

[51] Int. Cl.$^5$ ............................ D01F 8/06; D01F 8/14
[52] U.S. Cl. .................................... 264/103; 264/171;
264/235.6; 264/210.8; 264/211.17; 264/290.5;
264/346; 210/497.01; 210/500.27
[58] Field of Search ................. 264/235.6, 346, 210.8,
264/171, 103, 211.17, 290.5; 210/500.27,
500.21, 497.01

[56] References Cited

U.S. PATENT DOCUMENTS

| | | | |
|---|---|---|---|
| 3,762,564 | 10/1973 | Weedon et al. | 210/446 |
| 3,947,538 | 3/1976 | Marshall et al. | 264/210.7 |
| 4,100,009 | 7/1978 | Nakajima et al. | 156/184 |
| 4,469,540 | 9/1984 | Furukawa et al. | 264/171 |
| 4,552,603 | 11/1985 | Harris, Jr. et al. | 264/235.6 |
| 4,871,499 | 10/1989 | Audoux et al. | 264/235.6 |

FOREIGN PATENT DOCUMENTS

56-43139 4/1981 Japan .

*Primary Examiner*—Hubert C. Lorin
*Attorney, Agent, or Firm*—Fay, Sharpe, Beall, Fagan, Minnich & McKee

[57] ABSTRACT

Polyolefin/polyester composite fibers having a low apparent Young's modulus and a filter element using the composite fibers are produced by subjecting a polyolefin as sheath component and a polyester as core component to composite spinning, stretching the resulting unstretched filaments to twice or more the original length at a temperature higher than the secondary transition point of the polyester by 20° C. or higher and lower than the melting point of the polyolefin and annealing the stretched filaments at the above-mentioned temperature for 30 seconds or more, and having an apparent Young's modulus of 210 Kg/cm$^2$ or less, and by winding up the above composite fibers on a core while heating the composite fibers to the melt-adhesion temperature of the sheath component, adjusting the void content to a desired one, followed by cooling and taking out the core.

8 Claims, No Drawings

PROCESS OF PRODUCING A FILTER ELEMENT OF COMPOSITE FIBERS

BACKGROUND OF THE INVENTION

1. Field of the Invention

This invention relates to polyolefin/polyester composite fibers having a low apparent Young's modulus and a filter element using the same.

2. Description of the Related Art

A process for producing a hollow cylindrical filter element by winding up a web composed of polyolefin composite fibers on a core while heating the web is disclosed in Japanese patent publication No. Sho 56-43139/1981. According to the process, it is possible to obtain a filter element having a desired porosity by controlling the pressure at the time of winding-up, but since the raw material of the element is of polyolefin composite fibers, there has been raised a drawback that the upper limit of the service temperature is as low as 80° to 90° C., and also there has been raised a problem that the filter element swells depending on the liquid passing through the element.

Further, in order to obtain a filter element endurable to its use at high temperatures, there have been an attempt of replacing the above-mentioned polyolefin composite fibers by polyester fibers using a low melting non-crystalline polyester as the sheath component thereof and a high melting crystalline polyester as the core component thereof, but since the low melting polyester is vitreous, there has been raised a problem that the low melting polyester peels off in the form of powder at the steps of spinning and stretching or at the steps of production and use of the filter element. Further, when polyolefin/polyester composite fibers using polyethylene as the sheath component thereof and a crystalline polyester as the core component thereof are used, there is a drawback that since the apparent Young's modulus of the polyester is high, the resulting filter element is bulky and low in density; hence it is not only difficult to catch fine particles, but also the element is low in hardness and soft, and hence not endurable to practical use.

SUMMARY OF THE INVENTION

The present inventors have made extensive research in order to overcome the above-mentioned various drawbacks of conventional filter elements and as a result have achieved the present invention.

The present invention in a first aspect resides in:

(1) a process for producing polyolefin/polyester composite fibers, which comprises subjecting a polyolefin as the sheath component thereof and a polyester as the core component thereof to composite spinning, stretching the resulting unstretched filaments to twice or more the original length at a temperature higher than the secondary transition point of the polyester by 20° C. or more and lower than the melting point of the polyolefin and annealing the resulting stretched filaments at a temperature higher than the secondary transition point of the polyester by 20° C. or more and lower than the melting point of the polyolefin for 30 seconds or more, and having an apparent Young's modulus of 210 Kg/mm² or less.

The present invention in a second aspect resides in:

(2) a process for producing a filter element obtained by winding up polyolefin/polyester composite fibers according to the above item (1) on a core while heating the composite fibers to the melt-adhesion temperature of the sheath component of the composite fibers, adjusting the porosity thereof to a desired one, and cooling the resulting material and taking out the core. The filter element may be prepared according to the process disclosed in Japanese patent publication No. Sho 56-43139/1981. The filter element of the present invention has a suitable void content, a high hardness, an upper limit of the service temperature as high as 140° C. and a small swelling by liquid.

DETAILED DESCRIPTION OF PREFERRED EMBODIMENTS

The polyolefin used in the present invention may be so far known polyolefins such as high density polyethylene, low density polyethylene, crystalline polypropylene, etc., and in the case of polyethylene, those having a melt index of 5 or higher, particularly 10 or higher are preferred, while in the case of crystalline polypropylene, those having a melt flow rate of 10 or more is preferably used.

The polyester used in the present invention may be those having a melting point of 200° C. or higher and ethylene terephthalate units occupying 50% by weight or more of the molecule and being of fiber grade. The secondary transition point of the polyester is in the range of 65°–85° C.

Such polyolefin and polyester are subjected to composite spinning so as to give sheath and core type composite fibers according to a known process. The resulting unstretched filaments are stretched to twice or more the original length at a temperature higher than the secondary transition point of the polyester by 20° C. or more, preferably 30° C. or more and lower than the melt-adhesion temperature of the polyolefin and then annealed at a temperature higher than the secondary transition point of the polyester by 20° C. or more and lower than the melting point of the polyolefin for 30 seconds or longer. If the stretching temperature is lower than the above-mentioned temperature, the resulting composite fibers have a high apparent Young's modulus and if a filter element is produced using the fibers, only a product having drawbacks like the above-mentioned conventional techniques is obtained. Further, if the stretching temperature is the secondary transition point or lower, when the resulting stretched fibers are used for producing filter elements, the fibers result in a high percentage of heat shrinkage at the processing temperature thereof, to yield a filter element having projections and depressions on its surface and a non-uniform distribution of pore therein. If the annealing temperature is lower than the above-mentioned range, or the annealing time is less than 30 seconds, the resulting composite fibers have a high apparent Young's modulus so that filter elements using such composite fibers have a high porosity and hence are unsuitable for precise filtration.

The present invention will be described in more detail by way of Examples and Comparative examples.

In addition, measurement methods employed in these examples are described below.

Apparent Young's modulus:

This value was obtained by firstly measuring an initial tensile stress according to item 7–10 of JIS L1013 (testing methods for man-made filament yarns) and then calculating the value from the above initial tensile stress according to the following equation:

Apparent Young's modulus (Kg/mm²)=9×σ×(initial degree of tensile resistance)(g/d)
wherein as σ, 1.15 was used in the case of PP (polypropylene)/PET (polyester) and 1.17, in the case of PE/PET.

Filtration test:

A suspension of fine abrasive powder (OF #1200, particle diameter 5 to 15 μm, 90%) (20 g) in water (50 l) was passed from the outer surface of a filter element into the hollow portion thereof at a rate of 2 m³/hr in a recycle manner. After 2 minutes, particles in 100 ml of collected filtrate water were collected on a membrane filter capable of collecting particles down to 1 μm in particle diameter, followed by measuring the particle diameters of 3,000 particles by means of "Luzex 450" (trademark) manufactured by Nileco Co., Ltd. Swelling test:

The volume (V') of a filter element treated under a condition of boiling water (100° C., 2 hours), toluene (20° C., 5 days)or hot air (120° C., 5 days) was calculated from the value of outer diameter (d') and length (l'). The volume (V) of the filter element before the treatment was calculated in the same manner. The percentage of swelling was calculated according to the following equation:

$$\frac{V' - V}{V} \times 100 = \text{percentage swelling}$$

EXAMPLE 1

Composite spinning was carried out using a polyester (PET) (intrinsic viscosity 0.65, m.p. 255° C., secondary transition point 70° C.) as a core component and a high density polyethylene (melt index 20, m.p. 130° C.) as a sheath component in a composite ratio of 1/1 to prepare unstretched filaments (single filament fineness: 10 d), followed by stretching the filaments to 3 times the original length at 110° C. and then annealing at 90° C. for 3 minutes to obtain stretched filaments (single filament fineness: 3.5 d). The stretched filaments were cut to a fiber length of 51 mm to obtain staple fibers, which were then made up into a web having a basis weight of 20 g/m² by means of a carding machine, followed by heating the web successively from its end, to 140°-150° C. for 2 seconds by means of a far infrared ray heater, while sending the web horizontally, to form a web in a state where the high density polyethylene alone was melted, winding up the web in a definite amount onto a stainless steel core (outer diameter: 30 mm, 4 Kg/m) under pressure by its self-weight, cooling the web, drawing out the central core and cutting the web to obtain a filter element having an outer diameter of 70 mm, an inner diameter of 30 mm, a length of 250 mm and a weight of 240 g.

Thus obtained filter element was very hard and had neither wrinkle nor warp on both the inner and the outer surfaces, and when its cross section was observed, pores are uniformly distributed.

The stretching conditions and apparent Young's modulus of the above stretched filaments and the results of the filtration test and swelling test of the filter element are shown in Table 1.

EXAMPLE 2

Composite spinning was carried out in the same manner as in Example 1 except that a crystalline polypropylene (melt flow rate 15, m.p. 160° C.) was used as the sheath component, to obtain unstretched filaments (single filament fineness: 10 d), which were then stretched to 3.5 times the original length at 140° C., followed by annealing at 135° C. for 5 minutes and cutting to prepare staple fibers having a single filament fineness of 3 d and a fiber length of 51 mm, which were processed in the same manner as in Example 1 except that the heating temperature was changed to 170°-180° C., to obtain a filter element. This element was hard and homogeneous as in the case of that of Example 1. The evaluation results thereof are shown in Table 1.

Comparative examples 1 and 2

The unstretched filaments obtained in Example 1 were stretched in the same manner as in Example 1 except that the stretching temperature was changed to 70° C. (Comparative example 1) or 90° C. (Comparative example 2), followed by winding up the resulting stretched filaments onto a stainless steel core in a definite quantity, cooling and cutting in the same manner as in Example 1 to obtain filter elements. The elements were both soft and not compact and had a non-uniform pore content. The evaluation results are shown in Table 1.

REFERENCE EXAMPLE

Composite spinning was carried out using a crystalline polypropylene (melt flow rate 8, m.p. 160° C.) as a core component and a high density polyethylene (melt index 20, m.p. 130° C.) as a sheath component in a composite ratio of 1/1, to prepare unstretched filaments, followed by stretching the filaments to 3.5 times the original length at 90° C. and then annealing at 100° C. for 3 minutes and cutting to obtain staple fibers (single filament fineness 3 d, fiber length 51 mm). A filter element was obtained using the staple fibers in the same manner as in Example 1 except that the heating temperature was changed to 130°-140° C. This element was of a good quality but inferior in the heat resistance and solvent resistance to that of Example 1.

TABLE 1

|  |  | Example 1 | Example 2 | Comp. ex. 1 | Comp. ex. 2 | Ref ex. |
|---|---|---|---|---|---|---|
| Stretched filaments | Core component | PET | PET | PET | PET | PP |
|  | Sheath component | HDPE | PP | HDPE | HDPE | HDPE |
|  | Stretching temp. (°C.) | 110 | 140 | 70 | 90 | 90 |
|  | Annealing °C. | 90 | 135 | — | — | 100 |
|  | min. | 3 | 5 | — | — | 3 |
|  | Apparent Young's modulus | 207 | 161 | 275 | 284 | 137 |
| Filter element | Filtration test Less than 3 μm | 1622 | 1637 | 1052 | 1088 | 2736 |
|  | 5~3 μm | 988 | 1021 | 751 | 770 | 230 |
|  | 10~5 μm | 369 | 335 | 742 | 727 | 29 |
|  | More than 10 μm | 21 | 7 | 455 | 415 | 6 |
|  | Swelling Hot air | 0.50 | 0.42 | 0.49 | 0.66 | 3.0 |

TABLE 1-continued

|      |            | Example 1 | Example 2 | Comp. ex. 1 | Comp. ex. 2 | Ref ex. |
|------|------------|-----------|-----------|-------------|-------------|---------|
| test | Hot water  | 0.62      | 0.53      | 0.72        | 0.83        | 2.3     |
|      | Toluene    | 3.22      | 3.10      | 3.72        | 4.00        | 12.5    |
| Weight |          | 240       | 240       | 245         | 245         | 240     |
| Out diameter mm | | 70       | 70        | 77          | 74          | 70      |

What we claim is:

1. A process for producing polyolefin/polyester composite fibers, comprising the steps of:

spinning a polyester core and a polyolefin sheath to achieve resulting composite fibers;

stretching the resulting composite fibers to twice or more the original length at a temperature higher than the secondary transition point of said polyester by 20° C. or more and lower than the melting point of said polyolefin to achieve resulting composite fibers; and annealing the resulting composite fibers at a temperature higher than the secondary transition point of said polyester by 20° C. or more and lower than the melting point of said polyolefin for 30 second or more, to obtain composite fibers having a low apparent Young's modulus of 210 Kg/mm$^2$ or less.

2. A process for producing polyolefin/polyester composite fibers according to claim 1, wherein said polyolefin is selected from the group consisting of high density polyethylene, low density polyethylene and crystalline polypropylene.

3. A process for producing polyolefin/polyester composite fibers according to claim 1, wherein said polyester is selected from those having a melting point of 200° C. or higher and ethylene terephthalate units occupying 50% by weight or more of the molecule and being of fiber grade.

4. A process for producing a filter element, which comprises:

winding up on a winding core polyolefin sheath-/polyester core composite fibers that have previously undergone stretching to at least twice their original length at a temperature at least 20° C. higher than the second transition point of the polyester and lower than the melting point of the polyolefin, and annealing for at least 30 seconds at a temperature lower than the melting point of the polyolefin and at least 20° C. higher than the secondary transition point of polyester, such that the fibers have an apparent Young's modulus of 210 Kg/mm$^2$ or less;

winding while heating said composite fibers to the melt-adhesion temperature of the sheath component of said composite fibers to adjust the void content thereof to a desired one;

cooling the resulting material;

taking out said winding core; and obtaining a dense filter having low porosity.

5. A process for producing polyolefin/polyester composite fibers, comprising the steps of:

spinning a fiber comprising a polyester core and a polyolefin sheath to achieve a resultant spun fiber;

stretching the resultant spun fiber under stretching conditions which lead to increasing the resultant spun fiber from an original length to a length that is at least twice the original length at a stretching temperature that is lower than a melting point of the polyolefin and at least 20° C. higher than a secondary transition point of the polyester to provide a resultant stretched fiber;

annealing the resultant stretched fiber for at least 30 seconds at a temperature lower than the melting point of the polyolefin and at least 20° C. higher than the secondary transition point of polyester; and obtaining a resultant composite fiber having an apparent Young's modulus of 210 Kg/mm$^2$ or less.

6. A process for producing a hard, homogenous filter element, comprising the steps of:

winding on a winding element composite fibers comprising a polyolefin sheath component and a polyester core component produced according to a process comprising the steps of:

spinning a fiber comprising a polyester core and a polyolefin sheath to achieve a resultant spun fiber;

stretching the resultant spun fiber under stretching conditions which lead to increasing the resultant spun fiber from an original length to a length that is at least twice the original length at a stretching temperature that is lower than a melting point of the polyolefin and at least 20° C. higher than a secondary transition point of the polyester to provide a resultant stretched fiber;

annealing the resultant stretched fiber for at least 30 seconds at a temperature lower than the melting point of the polyolefin and at least 20° C. higher than the secondary transition point of polyester; and obtaining a resultant composite fiber having an apparent Young's modulus of 210 Kg/mm$^2$ or less;

winding while heating the fibers to the melt-adhesion temperature of the sheath component of the composite fibers to adjust the void content thereof and to obtain a resulting material;

cooling the resulting material; and removing the winding element.

7. A process for producing a hard, homogenous filter element, according to claim 6, wherein the filter element has low porosity.

8. A process for producing a hard, homogenous filter element, according to claim 6, wherein the filter element has an upper limit service temperature of 140° C.

* * * * *